(12) United States Patent
Wagner

(10) Patent No.: US 6,669,755 B2
(45) Date of Patent: Dec. 30, 2003

(54) APPARATUS AND METHOD FOR TREATING CONTAINERIZED FEED MATERIALS IN A LIQUID REACTANT METAL

(75) Inventor: Anthony S. Wagner, Lakeway, TX (US)

(73) Assignee: Clean Technologies International Corporation, Lakeway, TX (US)

( * ) Notice: Subject to any disclaimer, the term of this patent is extended or adjusted under 35 U.S.C. 154(b) by 0 days.

(21) Appl. No.: 10/162,303

(22) Filed: Jun. 4, 2002

(65) Prior Publication Data

US 2003/0222382 A1 Dec. 4, 2003

(51) Int. Cl.[7] .............................................. C22B 7/00
(52) U.S. Cl. .......................... 75/414; 75/396; 75/398; 75/610; 75/622; 75/623; 75/619; 266/205; 266/227
(58) Field of Search ........................ 75/672, 396, 398, 75/610, 622, 623, 619, 414; 266/205, 227

(56) References Cited

U.S. PATENT DOCUMENTS

| 4,469,661 | A | 9/1984 | Shultz |
|---|---|---|---|
| 4,552,667 | A | 11/1985 | Shultz |
| 4,599,141 | A | 7/1986 | Shultz |
| 4,602,574 | A | 7/1986 | Bach et al. |
| 4,666,696 | A | 5/1987 | Shultz |
| 4,695,447 | A | 9/1987 | Shultz |
| 5,000,101 | A | 3/1991 | Wagner |
| 5,167,919 | A | 12/1992 | Wagner |
| 5,191,154 | A | 3/1993 | Nagel |
| 5,202,100 | A | 4/1993 | Nagel et al. |
| 5,271,341 | A | 12/1993 | Wagner |
| 5,301,620 | A | 4/1994 | Nagel et al. |
| 5,322,547 | A | 6/1994 | Nagel et al. |
| 5,324,341 | A | 6/1994 | Nagel et al. |
| 5,354,940 | A | 10/1994 | Nagel |
| 5,358,549 | A | 10/1994 | Nagel et al. |
| 5,358,697 | A | 10/1994 | Nagel |
| 5,359,947 | A | 11/1994 | Wagner |
| 5,431,113 | A | 7/1995 | Wagner |
| 5,452,671 | A | 9/1995 | Wagner |
| 5,461,991 | A | 10/1995 | Wagner |
| 5,489,734 | A | 2/1996 | Nagel et al. |
| 5,505,143 | A | 4/1996 | Nagel |
| 5,553,558 | A | 9/1996 | Wagner |
| 5,564,351 | A | 10/1996 | Wagner |
| 5,585,532 | A | 12/1996 | Nagel |
| 5,640,702 | A | 6/1997 | Shultz |
| 5,832,845 | A | 11/1998 | Wagner |
| 5,866,095 | A | 2/1999 | McGeever et al. |
| 5,882,375 | A | * | 3/1999 | Edlinger et al. .............. 75/622 |
| 6,037,517 | A | 3/2000 | Wagner |
| 6,069,290 | A | 5/2000 | Wagner |
| 6,195,382 | B1 | 2/2001 | Wagner |
| 6,227,126 | B1 | 5/2001 | Wagner |
| 6,270,735 | B2 | 8/2001 | Wagner |
| 6,346,221 | B1 | 2/2002 | Wagner |
| 6,355,857 | B1 | 3/2002 | Wagner |

* cited by examiner

*Primary Examiner*—Melvyn Andrews
(74) *Attorney, Agent, or Firm*—Russell D. Culbertson; Shaffer & Culbertson, L.L.P.

(57) ABSTRACT

A treatment apparatus (10) includes a liquid reactant metal containment vessel (11) for containing a first liquid reactant metal and isolating the reactant metal from the atmosphere. A release chamber (14) is adapted to receive the first liquid reactant metal from the containment vessel (11) and a submerging arrangement (21) is adapted to dunk or submerge a container (46) of feed material into the liquid reactant metal and move the container to a release location within the release chamber (14). Relatively light materials rising from the submerged container (46), including unreacted feed material, intermediate reaction products, and perhaps final reaction products collect in a collection area (60) having an upper surface defined by an upper surface of the release chamber (14). A treatment arrangement included in the apparatus places the fluids collected in the collection area (60) in contact with the first liquid reactant metal or a second liquid reactant metal for a sufficient period of time to effect the desired reduction reactions.

28 Claims, 8 Drawing Sheets

APPARATUS AND METHOD FOR TREATING CONTAINERIZED FEED MATERIALS IN A LIQUID REACTANT METAL

TECHNICAL FIELD OF THE INVENTION

This invention relates to a liquid reactant metal treatment system. More particularly, the invention relates to an apparatus and method for treating containerized feed materials without having to first remove the materials from the containers.

BACKGROUND OF THE INVENTION

Many types of hazardous wastes or other waste materials are collected in drums, barrels, boxes, or other containers for long term storage. These containers of materials are often collected and stored pending a decision as to the appropriate disposal method for the materials. Very large quantities of some types of wastes have collected in storage because there has simply been no viable disposal alternative. This is particularly true for the vast quantities of mixed wastes which include halogenated hydrocarbons and other toxic materials mixed with high and low level radioactive materials, or nonhazardous materials that have been contaminated with hazardous and/or radioactive materials. Containerized wastes not only present the problem of disposing of the collected waste material itself, but also present the problem of either treating or disposing of the containers which have themselves become contaminated.

It is known that certain chemically active or reactant metals held as a liquid at elevated temperatures have the ability to chemically reduce organic compounds including hazardous compounds such as halogenated hydrocarbons. Suitable reactant metals include aluminum, magnesium, lithium, and alloys of these metals as described in U.S. Pat. Nos. 5,000,101, 6,069,290, and 6,355,857 to Wagner. The entire content of each of these prior patents is hereby incorporated in this disclosure by this reference. These liquid reactant metals chemically reduce organic molecules to produce mostly hydrogen and nitrogen gas, elemental carbon, char, and metal salts. Most metals mixed with the organic materials or bound up in organic molecules in the waste materials dissolve or melt into the liquid reactant metal. Low boiling point metals such as Mercury may go to a gaseous state and separate from the liquid reactant metal with other gases. Other metals alloy with the liquid reactant metal or separate from the liquid reactant metal by gravity separation.

A consistent issue in waste treatment processes utilizing a bath of a liquid reactant metal is ensuring sufficient contact between the liquid reactant metal and the waste material itself or intermediate compounds generated from initial reactions between the waste material and liquid reactant metal. Although in some cases, it may be desirable to control the reactions with the liquid reactant metal to prevent the feed material from being fully reduced, it is desirable in treating most waste materials to ensure sufficient contact with the liquid reactant metal to completely reduce the feed material. The problem of providing the required contact time is particularly acute with gaseous or volatile materials because such materials quickly separate from the liquid reactant metal and produce a bubble at the top of the liquid reactant metal container. The separated material must generally be forced again into the liquid reactant metal to allow the reduction reactions to continue, or more rapidly continue. U.S. Pat. No. 6,227,126 to Wagner is directed to an apparatus and process for treating gaseous and volatile material in a liquid reactant metal. In this system, the feed material is injected into a treatment chamber and the flow or passage of gasses and reactant metal through the reaction chamber is manipulated to mix the respective materials and ensure sufficient contact to completely reduce the gaseous materials.

U.S. Pat. No. 5,452,671 is directed to an apparatus and process for using a liquid reactant metal to destroy highly hazardous liquid and gaseous compounds, particularly materials used as chemical weapons or used to produce chemical weapons. This patent discloses treating a canister of hazardous materials by dunking the canister into a liquid metal bath and holding the canister under the surface of the liquid reactant metal. The patent discloses a unique dunking mechanism that forces gasses escaping from the submerged container to collect at different collection points within the liquid reactant metal and follow a tortuous path through the liquid reactant metal before reaching the uppermost surface of the reactant metal. Forcing gasses to follow this tortuous path through the various subsurface collection points was intended to provide the desired contact between the reactant metal and chemicals in the gas. Although this dunking arrangement may be suitable for many applications, there remains a need for an apparatus and process for treating containerized feed materials in a liquid reactant metal so as to ensure sufficient contact between the liquid reactant metal and the feed material/intermediate reaction products to allow the desired reduction reactions to proceed to completion.

SUMMARY OF THE INVENTION

An apparatus according to the invention includes a liquid reactant metal containment vessel for containing a first liquid reactant metal and isolating the reactant metal from the atmosphere. The apparatus further includes a release chamber adapted to receive the first liquid reactant metal from the containment vessel. A submerging or dunking arrangement included in the apparatus is adapted to dunk or submerge a container of feed material into the liquid reactant metal and move the container to a release location within or adjacent to the release chamber. Relatively light materials rising from the submerged container, including unreacted feed material, intermediate reaction products, and perhaps final reaction products, collect in a collection area having an upper surface defined by an upper surface of the release chamber. A treatment arrangement included in the apparatus places the fluids collected in the collection area in contact with the first liquid reactant metal or a second liquid reactant metal for a sufficient period of time to effect the desired reduction reactions.

The present invention has the advantage that the containers of feed material can be treated as a unit and the feed material is preferably not released from the container prior to introducing the material into the liquid reactant metal. Feed material is reduced to innocuous compounds or elements. Hazardous elements such as radioactive elements and other metals are captured in the liquid reactant metal or in a slag in the reactor. The containers themselves are also destroyed either by chemical reduction in the case of plastic or paper containers, or by melting or dissolution in the case of metal containers.

The term "feed material" will be used in this disclosure and the accompanying claims to describe the material to be treated in the apparatus and process of the present invention. Feed material may be homogenous or may be made up of mixtures of materials including nonhazardous materials, hazardous materials, or materials contaminated with hazardous materials. "Intermediate reaction products" will refer to partially chemically reduced materials produced in the course of reducing the feed materials. "Final reaction products" will refer to materials resulting from the complete reduction of the feed materials by reaction with the liquid reactant metal. It will be appreciated that the containers used to contain feed materials may be plastic drums or barrels, metal drums or barrels, paper or cardboard containers, or any other type of container that may be used to hold or contain feed materials for treatment in the present apparatus.

In one variation of the invention, the submerging arrangement includes a dunking member adapted to extend along an inclined path from a container feed area within the liquid reactant metal containment vessel to the release location within the release chamber. In this variation of the invention the release chamber is defined between an inlet opening and an outlet opening. The collection area includes an area defined between an upper inlet opening level and an interior boundary of the release chamber at a level above the upper inlet opening level. The treatment arrangement in this variation of the present invention includes a pump or other device for inducing a flow of liquid reactant metal through the release chamber and a retention or treatment chamber. The treatment chamber is connected to receive the flow of reactant metal from the release chamber together with any feed material, intermediate reaction products, and final reaction products, and to hold any unreacted materials in contact with the liquid reactant metal for a sufficient period of time to ensure the desired reactions.

In another variation of the invention, the collection area is not necessarily positioned so that a flow of liquid reactant metal through the release chamber or any downstream chamber provides the desired contact with the liquid reactant metal. In this form of the invention, feed materials from the container, intermediate reaction products, and perhaps some final reaction products are first collected in the collection area and then transferred from the collection area by suitable means into a separate reaction chamber. The separate reaction chamber and transfer structure forms the treatment arrangement in this form of the invention. The separate reaction chamber may be within the containment vessel in which the feed material was originally released and thus employ the same type of liquid reactant metal used in the release chamber. Alternatively, the separate reaction chamber may comprise a completely separate liquid reactant metal reactor using a second liquid reactant metal. In either alternative of the separate reaction chamber, some of the desired reduction reactions and the destruction of the container may still occur in the release chamber or in a reaction chamber downstream from the release chamber in a direction of reactant metal flow.

In both forms or variations of the treatment system described above, the apparatus includes an output chamber and reaction product removal arrangement for removing gasses, solids, and liquids from the output chamber. Solids comprising slag collecting at the surface of the liquid reactant metal in the output chamber and some liquids are preferably removed by a suitable skimming system. Gasses collect above the liquid reactant metal in the output chamber and are drawn off through a suitable vent line for further processing to recover the various constituents in the gases. Liquid taps may also be included in the output chamber for removing liquids which separate from the liquid reactant metal in the output chamber.

The slag removed from the output chamber may include metal salts such as aluminum chloride, unreacted minerals released from the feed material, and dross made up of oxides of the reactant metal. It has also been found that the slag may include a substantial fraction of reactant metal and other metals caught up and solidified with the other slag materials. In order to recover the reactant metal and other materials from the slag, the invention includes a slag processing device arranged to receive slag from the output chamber of the liquid reactant metal reactor. This slag processing device may comprise a second liquid metal reactor connected to receive the slag removed from the output chamber. This second liquid metal reactor may be entirely separate from the reactor receiving the containerized feed material or may be incorporated in the container treatment system in order to share the same liquid reactant metal. The treatment of slag in a second reactor reclaims solidified reactant metals and other metals from the slag. Alternatively to a second liquid metal reactor, the slag processing device may comprise a heating device adapted to heat the slag to selected temperatures in order to selectively melt desired materials out of the slag. Solidified reactant metal is recovered from the slag by holding the slag at a temperature just above the melting point of the reactant metal after first removing lower melting point materials.

These and other advantages and features of the invention will be apparent from the following description of the preferred embodiments, considered along with the accompanying drawings.

DESCRIPTION OF PREFERRED EMBODIMENTS

Figure 1:
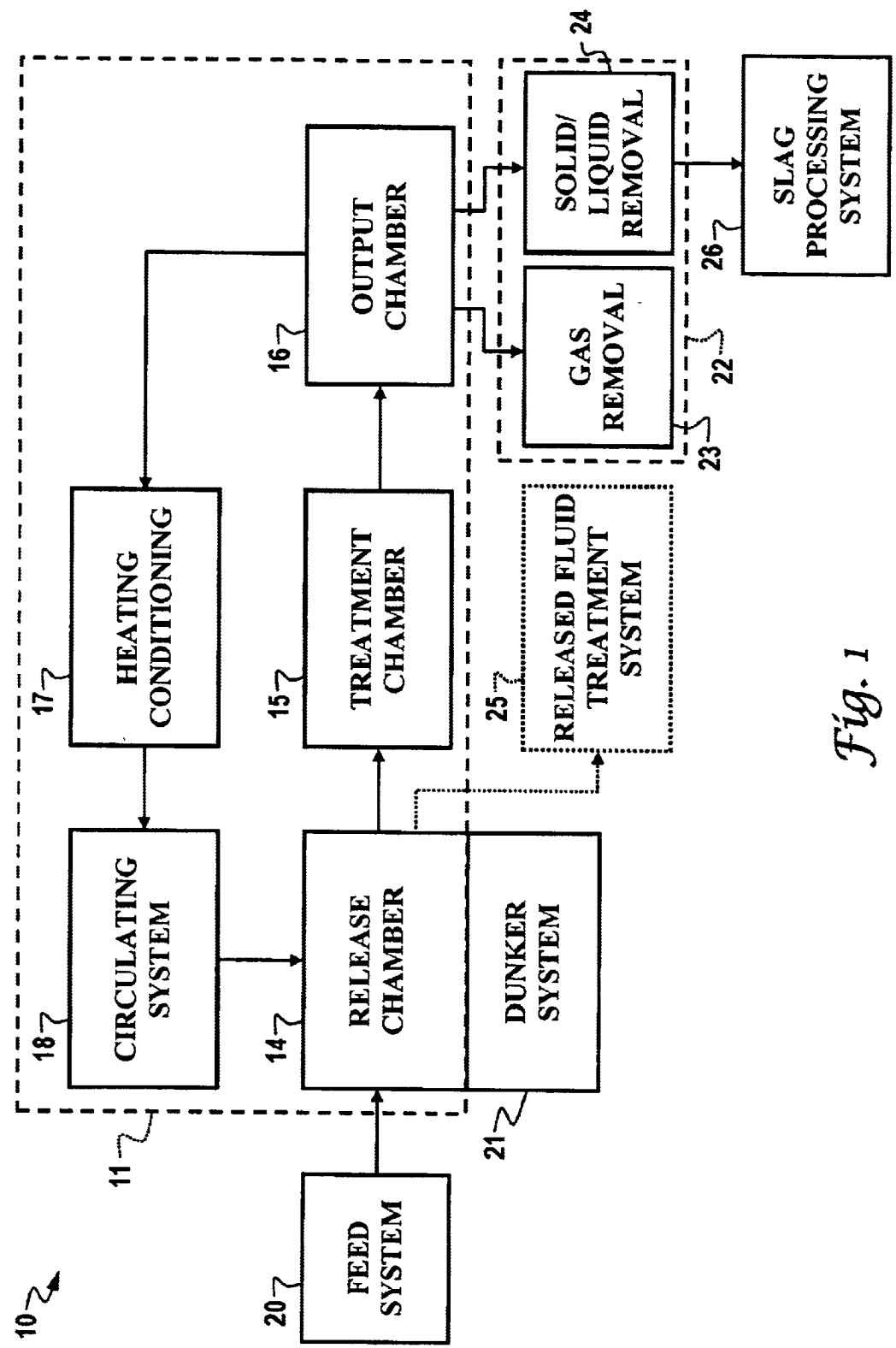
FIG. 1 is a schematic diagram showing a liquid reactant metal treatment apparatus embodying the principles of the invention.

Referring to FIG. 1, a liquid reactant metal treatment apparatus 10 embodying the principles of the invention includes a liquid reactant metal containment vessel indicated by dashed box 11. Several different chambers or systems are contained or defined within containment vessel 11. In particular, containment vessel 11 encompasses a release chamber 14, a treatment or retention chamber 15, an output chamber 16, a heating and conditioning chamber 17, and a circulating system 18. Apparatus 10 also includes a feed system 20 for feeding material to be treated into the containment vessel 11, a dunker or submerging system 21 for dunking material to be treated under the surface of the liquid reactant metal in or adjacent to release chamber 14, and a reaction product removal arrangement 22 including a gaseous reaction product removal component 23, and a solid/liquid reaction product removal component 24. All of these basic components are included in both the form of the invention shown in FIGS. 2 through 5 and the alternate form of the invention shown in FIGS. 6 through 8. Treatment apparatus 10 may further include a released fluid treatment arrangement 25. This released fluid treatment arrangement 25 will be described below with reference to the form of the invention shown in FIGS. 6 through 8. A slag-processing system 26 may be associated with solid/liquid removal component 24 for recovering reactant metal and other materials from the slag produced in treatment system 10 as will be discussed further below.

The basic form of the invention shown diagrammatically in FIG. 1 provides certain advantages in construction and in handling the required liquid reactant metal by defining release chamber 14, treatment chamber 15, output chamber 16, and heating and conditioning system 17, within the single continuous liquid reactant containment vessel 11. However, it will be appreciated that the invention is not limited to this configuration. The various chambers may be formed as separate chambers that are interconnected by suitable conduits or passageways to provide the required transfer of liquid reactant metal and reaction products/feed materials as will be described below. The single containment vessel and separate vessel/chamber configurations are to be considered equivalent for the purposes of the following claims.

Figure 2:
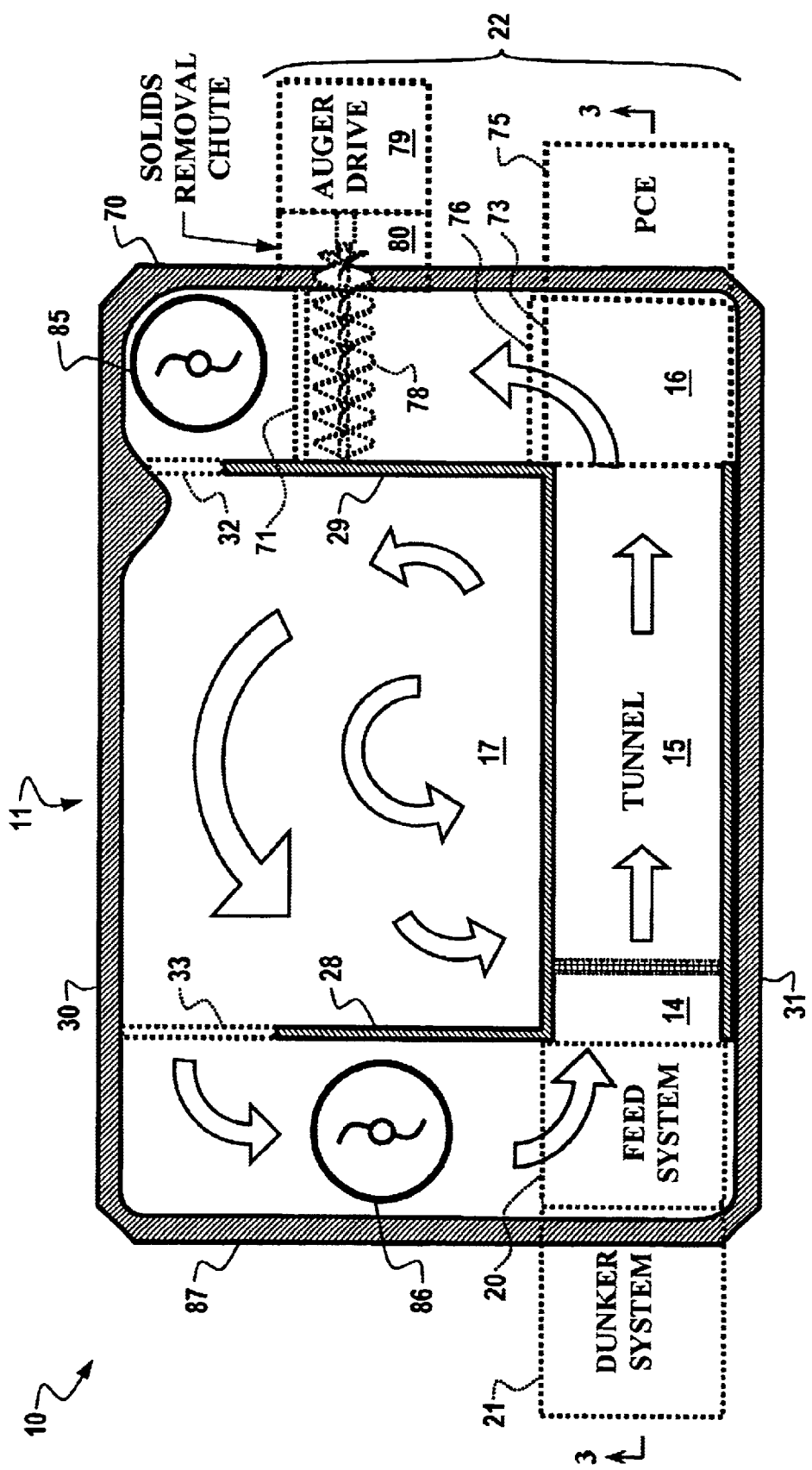
FIG. 2 is a somewhat diagrammatic section view of a liquid reactant metal treatment apparatus embodying the principles of the invention, as viewed from the level of line 2—2 shown in FIG. 3.
Figure 3:
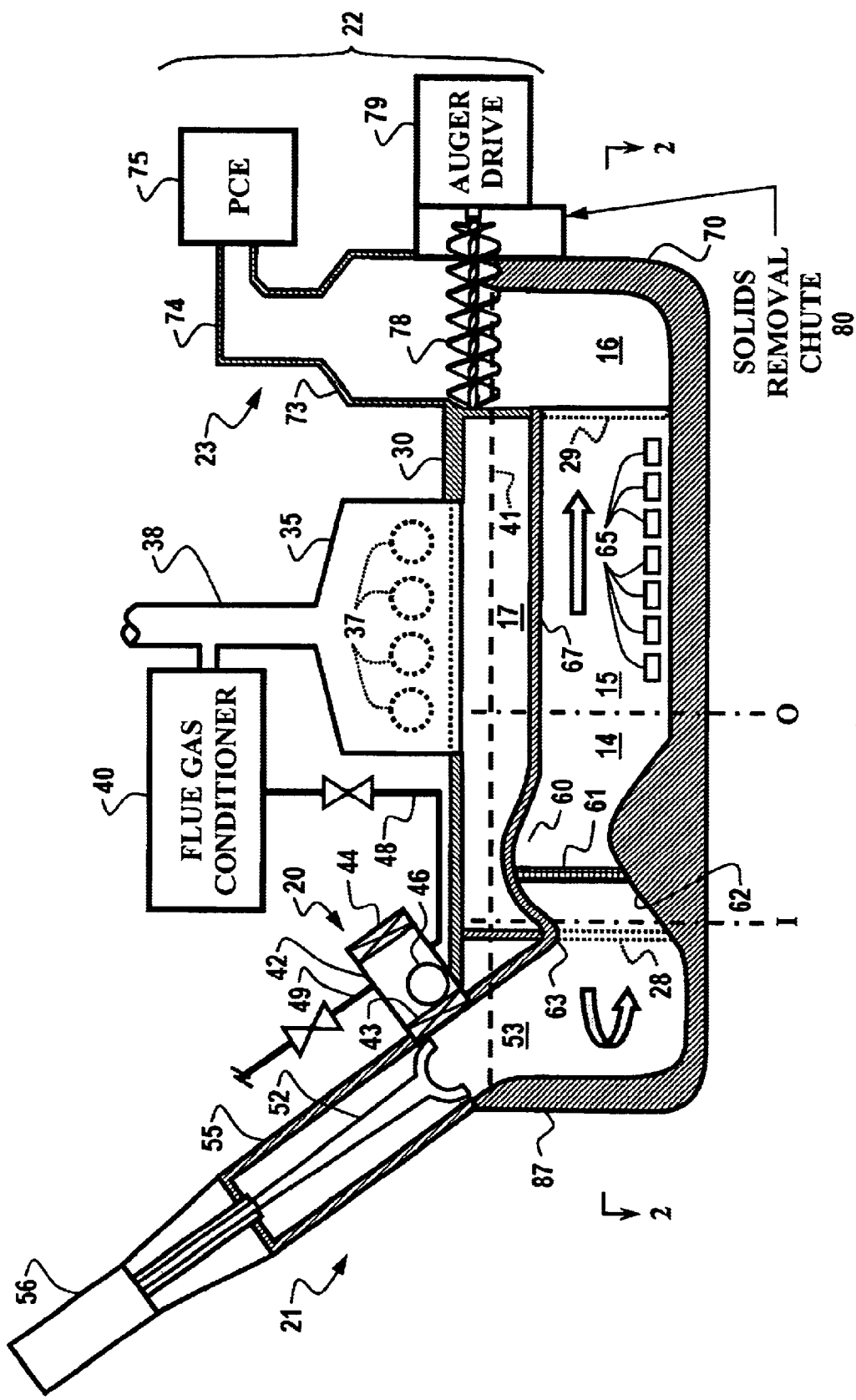
FIG. 3 is a view of the treatment apparatus in section taken along line 3—3 in FIG. 2.

In the form of the invention shown in FIGS. 2 through 5, containment vessel 11 is divided by various walls and weirs to form chambers 14, 15, 16, and 17. Heating and conditioning chamber 17 provides a containment area in which the liquid reactant metal may be heated and conditioned for use in treating the feed material. This chamber 17 is defined between dividing walls 28 and 29, and vessel exterior walls 30 and 31. Dividing walls 28 and 29 include weirs 32 and 33, respectively, which allow liquid reactant metal to be transferred to and from heating and conditioning chamber 17 as will be described further below. As shown in FIG. 3, a top cover 35 seals the top of chamber 17 and isolates the contents of the chamber from the atmosphere. A number of gas-fired burners 37 are enclosed in cover 35. These burners 37 burn an appropriate fuel such as natural gas or propane to supply the heat required to place the reactant metal at the desired temperatures, which may be on the order of 800 to 900 degrees Celsius for a reactant metal comprising predominantly aluminum. FIG. 3 also shows a flue or stack 38 connected to cover 35 for removing flue gas/heater combustion products from chamber 17. Some or all of the flue gas is drawn off to a flue gas conditioning arrangement shown diagrammatically at block 40 in FIG. 3. This flue gas conditioning arrangement 40 is used to cool and otherwise condition the flue gas to prepare it for use as a purge gas as will be described further below.

Figure 4:
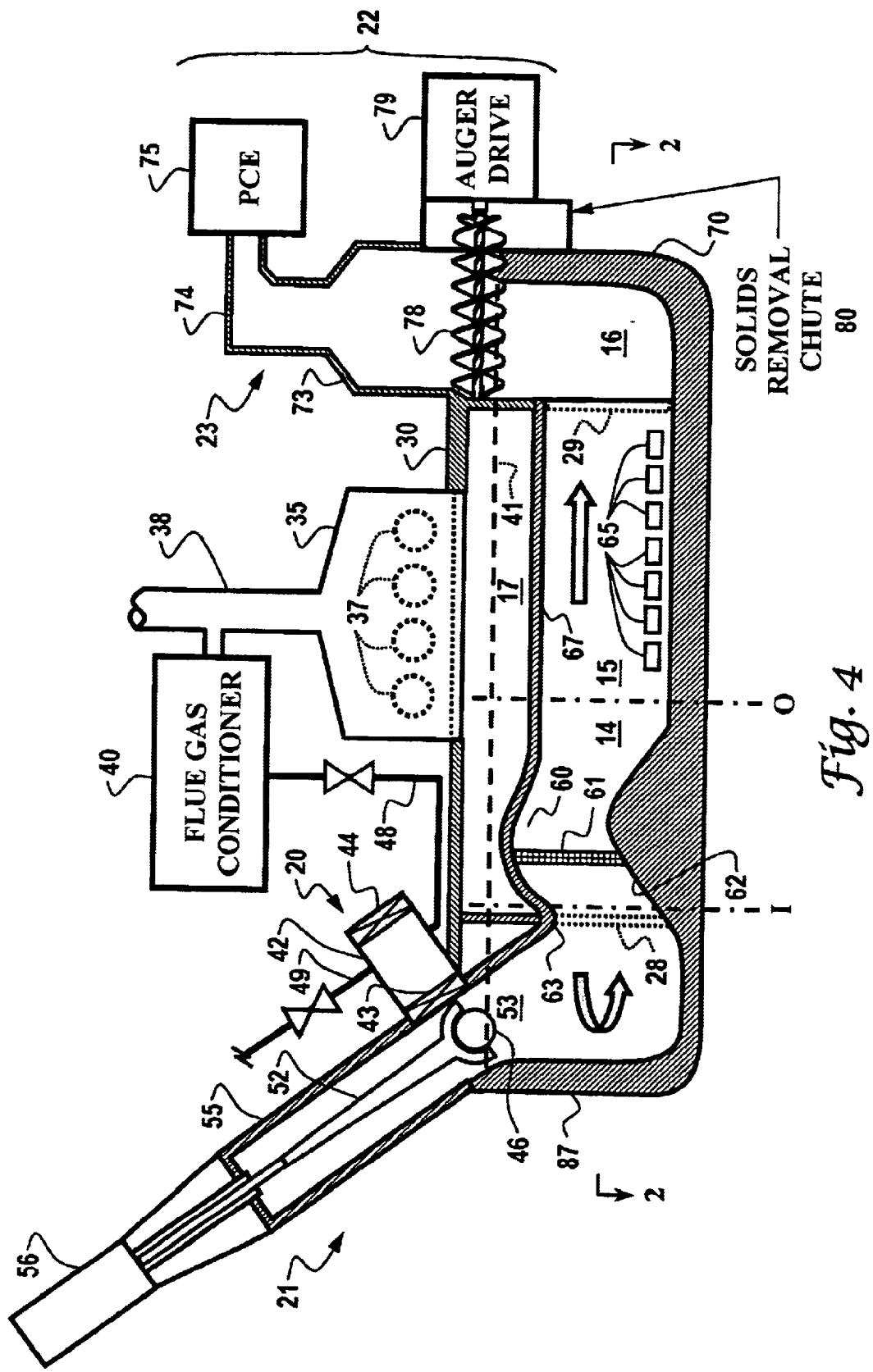
FIG. 4 is a view in section similar to FIG. 3, but showing a dunking device extended to make contact with a container of feed material deposited in the treatment apparatus.
Figure 5:
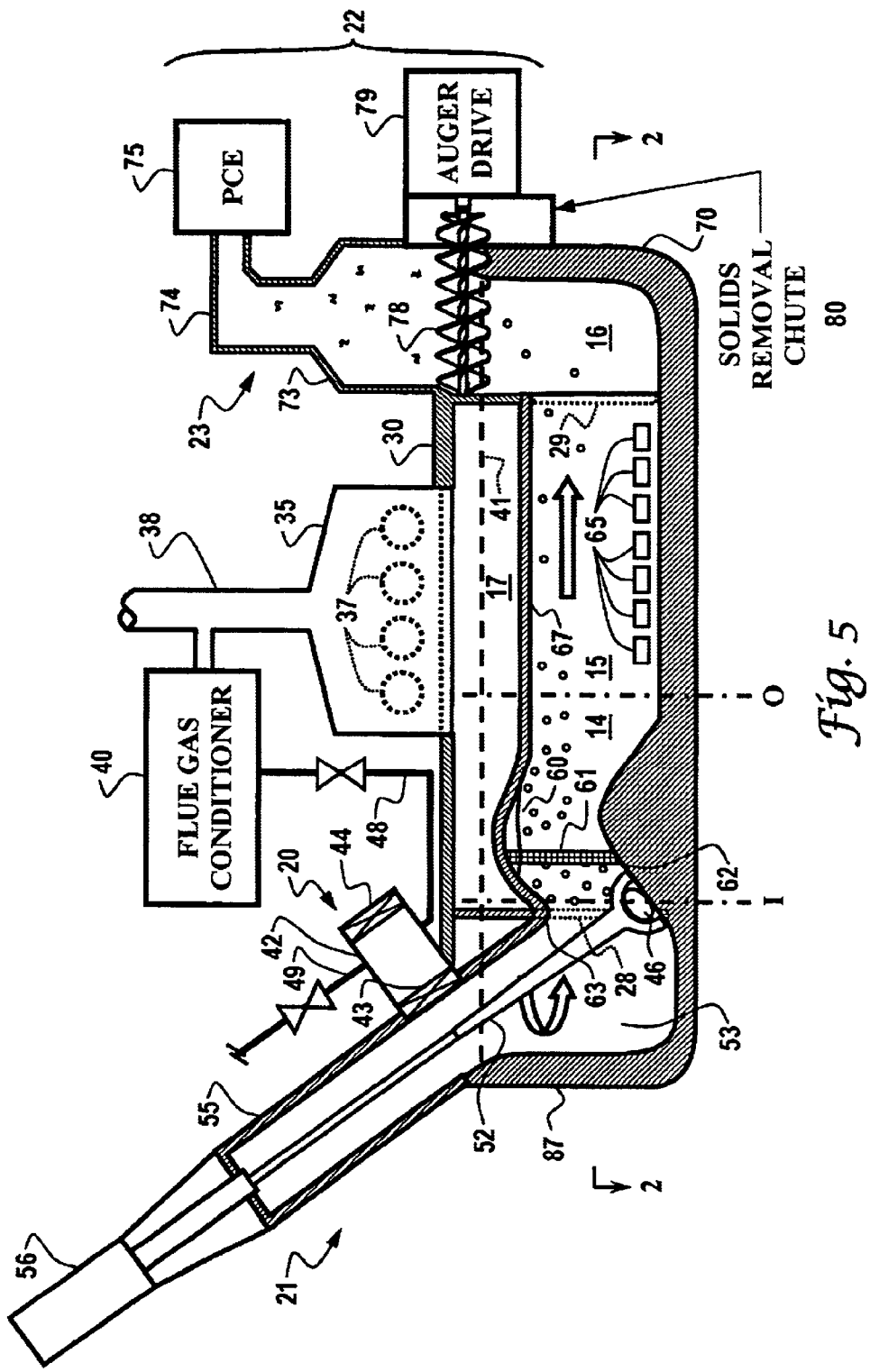
FIG. 5 is a view in section similar to FIG. 3, but showing the dunking device extended to a fully extended position to cause feed material to be released from a container.

The level of liquid reactant metal in vessel 11 is shown at dashed line 41 in FIGS. 3 through 5. The preferred liquid reactant metal comprises predominantly aluminum together with other metals. The specific proportions of the various metals in a liquid reactant metal suitable for use in apparatus 10 may be tailored for the feed material to be treated. U.S. Pat. Nos. 5,000,101, 6,069,290, and 6,355,857, which are incorporated herein by reference, describe various reactant metals which may be employed in apparatus 10. Further discussion of particular reactant metals or metal alloys will be omitted here so as not to obscure the present invention in unnecessary detail.

The feed system 20 in the form of the invention shown in FIGS. 2 and 3 includes a feed isolation chamber 42 having an inner airlock door 43 and an outer airlock door 44. This feed isolation arrangement isolates a container 46 of feed material in a substantially oxygen free environment and then releases the container into containment vessel 11. In operation, outer airlock door 44 is opened to introduce the container 46 of feed material into chamber 42. Outer airlock door 44 is then closed and feed isolation chamber 42, defined between doors 43 and 44, is purged with a suitable purge gas through purge input line 48. The gasses being purged exit through purge output line 49 and are directed through suitable conduits and valving to a vent or to further treatment as necessary. With the feed isolation chamber purged of oxygen, inner airlock door 43 is opened to allow container 46 to drop into liquid reactant metal containment vessel 11. Inner airlock door 43 is then closed, the chamber 42 is preferably purged again to make it ready to receive another container of feed material through outer airlock door 44. Gasses purged from chamber 42 may require significant treatment. In some cases these gasses may be directed to a liquid reactant metal treatment system specifically suited for treating gasses.

In order to treat containers of feed material which would otherwise float on the surface of the liquid reactant metal, the invention includes dunker structure or system 21 for dunking the containers in the liquid reactant metal. Dunker system 21 includes a dunker member 52 which may be extended to dunk or force a container of feed material below the surface 41 of liquid reactant metal in containment vessel 11, particularly in a feed area of the containment vessel shown at reference numeral 53 in FIG. 3. Dunker member 52 is housed in a dunker housing 55 forming essentially the cover of containment vessel 11 in the feed area 53 of the vessel. An actuator 56 associated with dunker housing 55 is adapted to move dunker member 52 between a retracted position shown in FIG. 3 to an extended position shown in FIG. 5. The dunker member extension sequence will be described further below in describing the operation of apparatus 10.

Dunker system 21 not only serves to dunk the container of feed material below the surface 41 of the liquid reactant metal but also moves the container to a release location within release chamber 14. In the form of the invention shown in FIGS. 2 through 5, release chamber 14 is defined in a tunnel structure beneath the level 41 of liquid reactant metal in vessel 11 between line 1 and line 0 in FIG. 3. The illustrated release chamber 14 includes a collection area 60, a solids blocking screen 61, and a crush surface 62. Solids blocking screen 61 comprises a screen material that is readily permeable by the liquid reactant metal, but adapted to block solids above a certain size and prevent the solids from exiting release chamber 14. Crush surface 62 comprises a surface extending substantially perpendicular to the extension axis of dunker member 52, and provides a surface against which the dunker member may press a container of feed material to break any seal provided by the container and allow its contents to be released into the liquid reactant metal in release chamber 14.

The portion of the tunnel structure in FIGS. 2 and 3 to the right of release chamber 14 comprises treatment chamber 15 in this form of the invention. The function of treatment chamber 15 in treatment system 10 is to help ensure that feed material and any intermediate reaction products are forced to remain in contact with the liquid reactant metal to ensure that the desired reduction reactions proceed to completion. The flow rate of liquid reactant metal through treatment chamber 15 may be controlled so that the length of the treatment chamber ensures sufficient residence time for the feed material and intermediate reaction products to effect the desired level of chemical reduction. The illustrated form of treatment chamber 15 includes openings 65 at its lower periphery that allow fluid communication directly between heating and a conditioning chamber 17 and the treatment chamber. These openings 65 allow fresh reactant metal to enter the treatment chamber along its length to help facilitate the desired reduction reactions. Openings 65 also perform a pressure relief function to accommodate gas pockets that are generated in treatment chamber 15 from the feed material and reaction products.

The treatment chamber tunnel 15 shown in FIG. 3 includes a generally horizontal upper boundary 67. Those skilled in the art will appreciate, however, that the surface forming upper boundary 67 may be inclined upwardly toward the exit end or right in FIG. 3. A series of transverse weirs may also be included near upper boundary 67 and spaced apart along the length of treatment chamber 15. These weirs would capture gases or light liquids and provide a more tortuous path through the liquid reactant metal in order to ensure the desired contact between the liquid reactant metal and gases or light liquids. Such a tunnel arrangement is illustrated in U.S. Pat. No. 6,227,126, the disclosure of which is incorporated herein.

The output chamber 16 in the form of the invention shown in FIGS. 2 and 3 is located at the right hand end of treatment chamber 15 in position to receive reaction products and liquid reactant metal exiting the treatment chamber. Output chamber 16 is defined in containment vessel 11 between wall 29, vessel exterior walls 70 and 31, and an output or surface collection weir 71. Output chamber 16 also includes a cover to isolate the liquid reactant metal in that part of the system from the atmosphere. The cover includes a gas recovery hood 73 which extends above the output chamber 16 in that part of the output chamber immediately adjacent to the end of treatment chamber 15. Output weir 71 extends from the top or cover of output chamber 16 down to a level well below the level 41 of liquid reactant metal in the output chamber. Liquid reactant metal may flow readily underneath output weir 71 to exit output chamber 16; however, reaction products and other materials collecting at the surface of the liquid reactant metal in the output chamber are retained in the output chamber to be removed by the reaction product removal arrangement 22 associated with output chamber 16.

In the form of the invention shown in FIGS. 2 and 3, the gas removal component 23 of the reaction product removal arrangement 22 includes a gas removal line 74 connected to receive gases collecting under gas collection hood 73. Line 74 is preferably connected to particle control and recovery equipment (PCE) 75. PCE 75 may include an aqueous scrubber, a bag house, and/or other particle control and recovery devices known in the field of liquid metal treatment systems. Gas removal component 23 may operate under the pressure generated by the collected gases or may include a vacuum arrangement for drawing gasses from the area of gas collection hood 73. Whether a vacuum is applied or otherwise, output chamber 16 may include a gas separation wall 76 (shown in FIG. 2) that extends downwardly from the output chamber cover to generally the level 41 (shown in FIG. 3) of liquid reactant metal in output chamber 16 to help retain gaseous reaction products in the area of gas collection hood 73 to be withdrawn through removal line 74.

The solids/liquids removal component 24 (shown in FIG. 1) in the illustrated form of the invention includes an auger 78 located adjacent to the end of output chamber 16 next to output weir 71. Auger 78 is driven by an auger drive 79 to scrape off solid materials or slag, and perhaps some liquids, which float on the surface of the liquid reactant metal in output chamber 16. These materials removed from the surface of the liquid reactant metal are scraped or directed into a solids removal chute and airlock system shown diagrammatically at reference numeral 80. Although not shown in the drawing, it will be appreciated that output chute and airlock system 80 will include a series of airlock doors or some other arrangement which may be operated to allow solids and liquids collected in the chute to be removed from the treatment system without allowing substantial amounts of air to enter the output chamber.

In order to provide the desired flow of liquid reactant metal through release chamber 14, treatment chamber 15, and output chamber 16, and to induce the desired circulation of liquid reactant metal in heating and conditioning chamber 17, the form of the invention shown in FIGS. 2 and 3 includes a circulating system. This circulating system corresponds to the circulating system 18 shown diagrammatically in FIG. 1. In the treatment apparatus shown in FIGS. 2 and 3, the circulating system includes two pumps or other suitable flow inducing devices. A first pump 85 is located adjacent to output weir 71 on the side opposite output chamber 16. This first pump 85 receives liquid reactant metal from output chamber 16 under output weir 71 and forces the liquid reactant metal under weir 32 into heating and conditioning chamber 17. A second pump 86 is located in an area of containment vessel 11 between wall 28 and vessel exterior wall 87. Second pump 86 receives heated and conditioned liquid reactant metal from chamber 17 under weir 33 and forces the liquid reactant metal through a passage defined between wall 28 and vessel outer wall 87 into feed area 53 and through release chamber 14 and treatment chamber 15 in the direction from left to right in FIGS. 2 and 3. The circulation arrows provided in FIGS. 2 and 3 show the desired circulation of liquid reactant metal within and through the various chambers of containment vessel 11.

Although not apparent from the drawings, it will be appreciated by those skilled in the art that all equipment must be designed to withstand the temperatures to which they are subjected in the system. Also, any components of apparatus 10 which come in contact with the liquid reactant metal must be made from, or must at least be coated with, a suitable protective material that will not react with or dissolve in the reactant metal. In preferred forms of the invention, the entire containment vessel 11 may be formed from a suitable fused silica or ceramic material. The walls, weirs, and tunnel defining the release chamber 14 and treatment chamber 15 may also be cast from fused silica. Dunker member 52 and solids blocking mesh 61 may be formed from a suitable metal or steel substructure coated with fused silica or some other suitable refractory material, or may also be cast or otherwise formed from a refractory material.

The operation of the form of the invention shown in FIGS. 2 and 3 may be described with particular reference to the section views of FIGS. 3 through 5. FIG. 3 shows the state of treatment apparatus 10 before the container 46 of feed material is released into the feed area 53 of containment vessel 11. In this position, container 46 is held in the feed system isolation or purge chamber 42 between airlock doors 43 and 44, and the area between the airlock doors 43 and 44 is purged with a suitable purge fluid. In this form of the invention the purge fluid comprises flue gas which originates from heating system 17, and is then conditioned in flue gas conditioning system 40. From this position shown in FIG. 3, lower or inner airlock door 43 may be opened to allow container 46 to drop into containment vessel 11 in feed area 53. As indicated in FIG. 4, dunker 52 may then be extended to make contact with container 46 as it floats on the surface of the liquid reactant metal at level 41. It will be noted that in this position shown in FIG. 4, liquid reactant metal continues to flow into feed area 53 and from the feed area into release chamber 14 as indicated by the arrows.

From the position shown in FIG. 4, and while pumps 85' and 86' (shown in FIG. 6) continue to induce the desired flow of liquid reactant metal, dunker member 52 is extended further to press container 46 into the liquid reactant metal below level 41. As shown in FIG. 5, dunker member 52 continues to extend and move container 46 to a release location at which the contents of the container are released into the liquid reactant metal. In the illustrated preferred form of the invention, dunker member 52 crushes or deforms container 46 against crush surface 62. This deformation of the container causes the seals on container 46 to rupture to effect the release of feed material into the liquid reactant metal. Other forms of the invention may not include a crush structure and may simply allow the container to be destroyed in the liquid reactant metal to release feed material.

The release location is preferably within release chamber 14 to the right of the release chamber inlet at line 1 in FIGS. 3 through 5. However, other forms of the invention may place the release location at the input end of release chamber 14 at line 1 or just outside the input end of the release chamber, just to the left of line 1. As indicated in FIG. 5, the release position within release chamber 14 together with the flow of liquid reactant metal into the release chamber, ensures that gases and light fluids and solids included in the feed material rise from the liquid reactant metal and collect in the release chamber itself. In particular, this material rising up from the liquid reactant metal rises into collection area 60 defined by the hump in release chamber 14 in the illustrated form of the invention. Forms of the invention in which the release position is at the entrance to release chamber 14 or just outside the entrance to the release chamber rely on the flow of liquid reactant metal to carry released material into the release chamber.

After container 46 has been held in the release position for a period of time to ensure that the bulk of the feed material within the container has been released into release chamber 14, dunker member 52 may be retracted from the fully extended position shown in FIG. 5. As dunker member 52 is retracted from its fully extended position, the remains of container 46 either remain on the bottom of containment vessel 11 or float to the surface. The flow of liquid reactant metal into release chamber 14 also flushes any solid or liquid remnants of the container to the right in the figure and generally prevents the material from flowing back into feed area 53. Any pieces of solid material larger than the screen size collect against screen 61 until the material either reacts with the liquid reactant metal or melts or dissolves into the liquid reactant metal. The resulting reaction products or melted or dissolved material continues to flow from left to right in the illustrated treatment system through release chamber 14, treatment chamber 15, and ultimately to output chamber 16.

It will be appreciated from FIG. 5 that the flowing surface of liquid reactant metal forming the lower boundary to the materials trapped in collection area 60 of release chamber 14 provides a continuously renewed surface of liquid reactant metal which may react with the trapped materials. The rate at which feed materials are introduced into release chamber 14 is limited so that substantial amounts of materials cannot escape back into feed area 53. Thus, provided the system is not overloaded, any materials trapped in collection area 60 must ultimately flow to the right in the figure, through treatment chamber 15 and ultimately to output chamber 16. The length of treatment chamber 15 together with the flow rate of liquid reactant metal through the release and treatment chambers are preferably designed to ensure that feed materials and intermediate reaction products are trapped in contact with the flowing surface of liquid reactant metal for a period of time sufficient to allow the desired reduction reactions with the liquid reactant metal to proceed to completion before reaching output chamber 16. The required residence time in release chamber 14 and treatment chamber 15 will vary depending upon the nature of the feed material, however, residence times on the order of one to three minutes will generally suffice.

The reason for some of the features of treatment apparatus 10 will be apparent considering the above description of the operation of treatment apparatus. Dunker member 52 preferably extends along an incline in order to push container 46 into release chamber 14 and particularly below the forward upper inlet opening boundary 63 of collection area 60 intersecting line 1 in FIGS. 3. through 5. This boundary 63 of collection area 60 is at a lower level than the top of the collection area and is below the level of the treatment chamber upper boundary at the 7 entrance to treatment chamber 15 to help ensure that gaseous material collecting in area 60 is forced to the right in the figures, through treatment chamber 15.

It will be appreciated that some untreated material and reaction products may periodically escape into the area above the liquid reactant metal level 41 in feed area 53. Most of this material will, in time, react with the liquid reactant metal to destroy hazardous compounds. This area may also be purged periodically to remove collected reaction products or unreacted materials. As discussed below with reference to the embodiment of the invention shown in FIGS. 6 through 8, any unreacted materials may be treated with either the same liquid reactant metal in system 10 or a liquid reactant metal in a separate system.

Final reaction products exit treatment chamber 15 into output chamber 16. Gaseous reaction products including gaseous carbon, hydrogen, nitrogen, some metal salts, and even some metals, escape to the surface of the liquid reactant metal in output chamber 16 and collect in the gas removal area 74 to be removed through particle collection and control equipment 75. It has also been found that some metals that exist as a gas at the temperature of the liquid reactant metal may be captured in the slag that forms at the surface of the liquid reactant metal in the output chamber and is not allowed to exit with other gases. Rather, this material collects along with solid slag and light fluids at the surface of the liquid reactant metal in output chamber 16 to be scraped off by auger 78 or other suitable skimming arrangement into solids removal chute and airlock system 80. Although not shown in the figures, heavy fluids such as metals that do not alloy with the liquid reactant metal may collect at the bottom of output chamber 16. A suitable tapping arrangement (not shown) may be included in vessel 11 at output chamber 16 in order to remove any such heavy fluid collecting at the bottom of the output chamber. The bulk of the liquid reactant metal flowing out of treatment chamber 15 flows through output chamber 16, flows underneath output weir 71, and is pumped back into heating and conditioning chamber 17 by pump 85.

It has been found that slag collecting at the surface of liquid reactant metal in output chamber 16 may include substantial amounts of reactant metal and other metals that may be liberated from the feed material. This reactant metal and other metals may solidify as gasses escape from the liquid reactant metal and is captured with other materials making up the slag. In order to recapture this solidified reactant metal and other metals isolated from the feed material, one aspect of the present invention includes treating the slag in a slag processing system such as system 26 shown in FIG. 1. The slag treatment may include recycling the slag through treatment apparatus 10 either in a container or otherwise, or treating the slag from output chamber 16 in a separate part of the treatment apparatus, or a completely separate liquid reactant metal treatment apparatus. Recycling the slag causes the captured reactant metal and other metals to remelt or dissolve back into the liquid reactant metal bath leaving only liquid or solid reaction products. These liquid and solid reaction products, unaccompanied by gasses exiting the liquid reactant metal, do not tend to capture significant amounts of reactant metal or other metals as they collect in a liquid metal treatment system output chamber, and may be drawn off without removing significant amounts of the reactant metal from the treatment system. In other forms of the invention, the slag drawn from the output chamber after treating a container of feed material may be treated in a furnace to separate out materials by melting temperature. This selective heating allows the reactant metal, certain metal salts, certain unreacted minerals, and other materials to be separated from the slag. For example, where the feed material includes Uranium, Plutonium, or rare earth metals, those metals may be captured in the slag and may be recovered from the slag by taking advantage of their different melting points. Strategic metals such as Titanium, Tungsten, and Vanadium may also be recovered from the slag in this fashion.

Although FIG. 5 shows container 46 actually being crushed in the release position, variations of the apparatus shown in FIGS. 2 through 5 may not crush the container to release feed material. For example, some forms of the invention may simply hold the container of feed material in contact with liquid reactant metal to allow the container to be compromised and then allow the feed material to be released. In one arrangement, dunker member 52 may be extended to hold the container 46 under the surface of the liquid reactant metal. In another arrangement, dunker member 52 or an alternate dunking arrangement may be operated to push a light container of feed material under the upper inlet opening boundary 63 of release chamber 14 past line 1 in FIGS. 3 through 5. The light container of feed material would then pop up into the hump defining the upper boundary of collection area 60 and be retained from moving further to the right in the figures by screen 61. Depending upon the nature of the container, the container material then reacts with the liquid reactant metal or melts or dissolves into the liquid reactant metal until the container is breached and feed material is released into direct contact with the liquid reactant metal.

Figure 6:
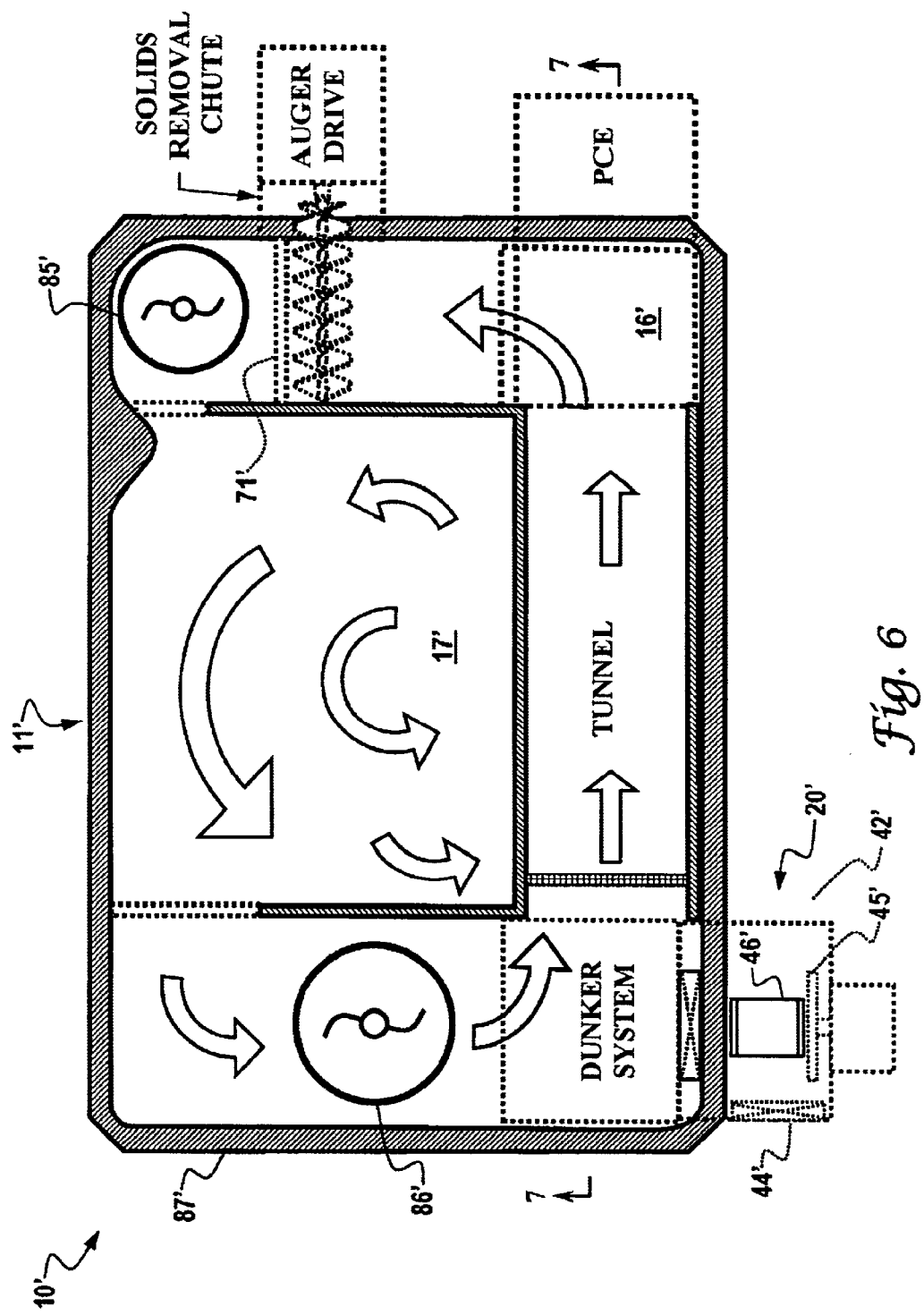
FIG. 6 is a somewhat diagrammatic section view of an alternative liquid reactant metal treatment apparatus embodying the principles of the invention, as viewed from the level of line 6—6 shown in FIG. 7.
Figure 7:
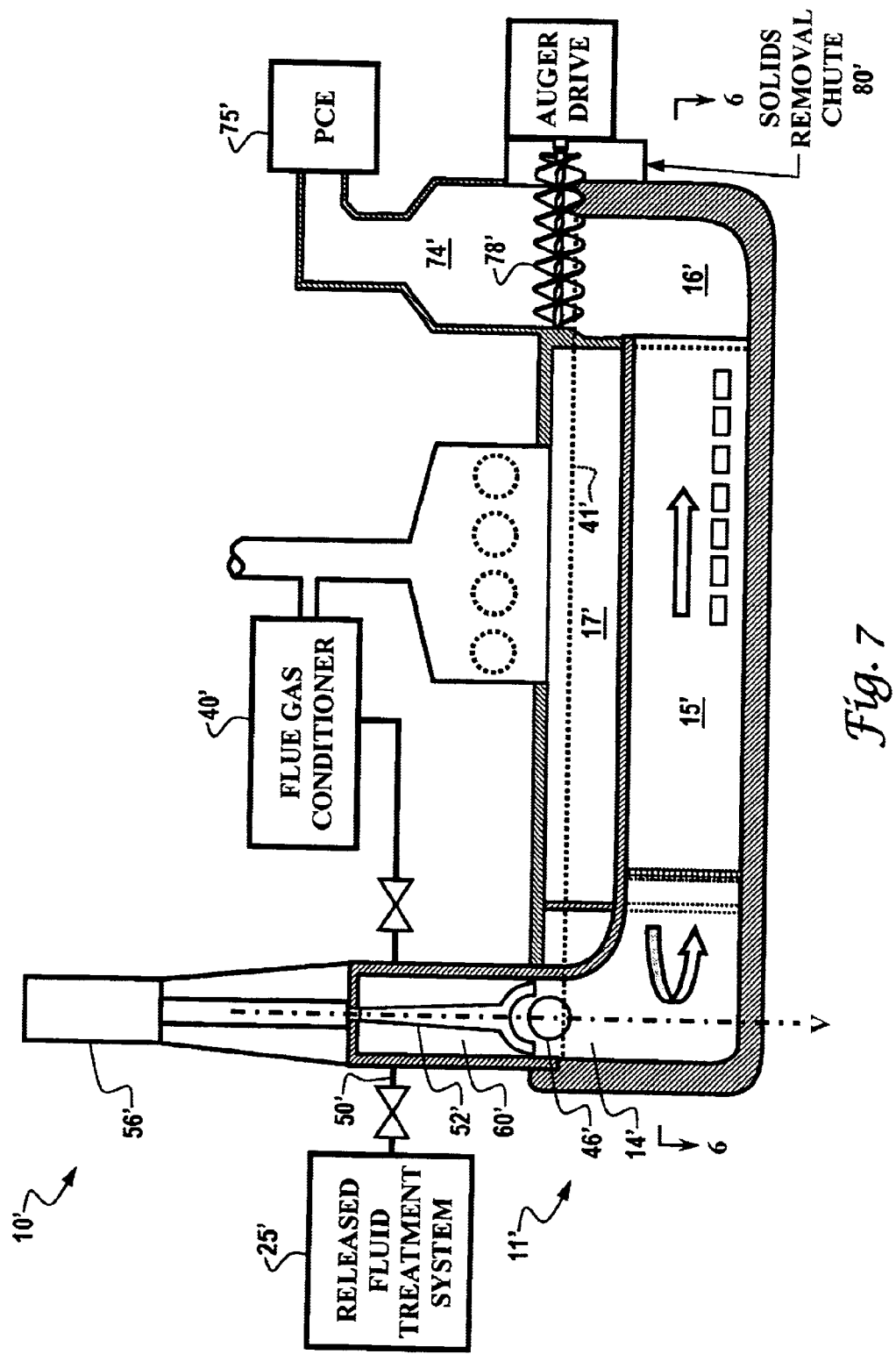
FIG. 7 is a section view of the alternate treatment system taken along line 7—7 in FIG. 6.
Figure 8:
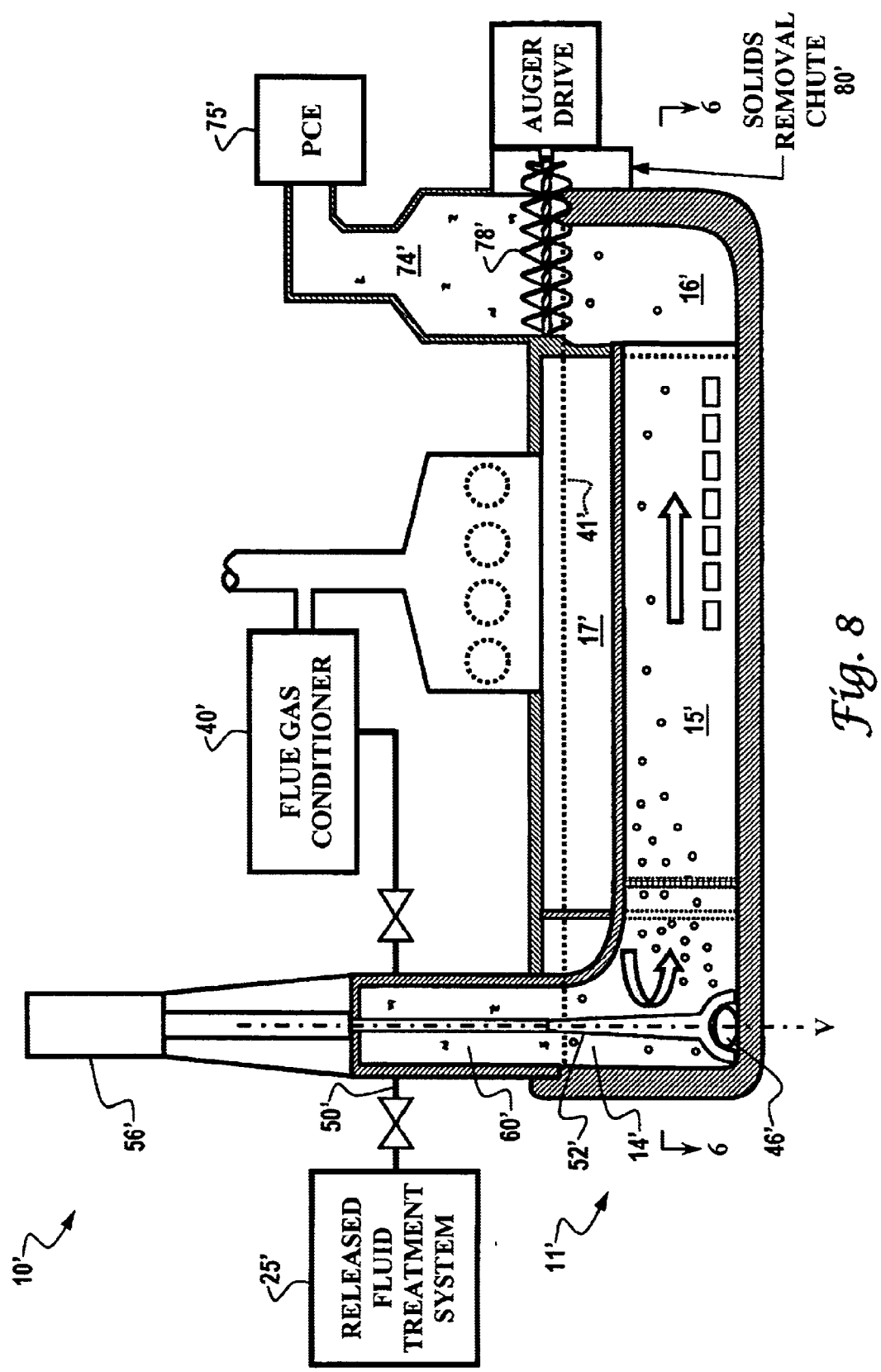
FIG. 8 in is a view in section similar to FIG. 7, but showing the dunking device fully extended to cause feed material to be released from a container deposited in the apparatus.

The alternate treatment apparatus 10' shown in FIGS. 6 through 8 includes a similar containment vessel 11', output chamber 16', heating and condition chamber 17', and circulating system including pumps 85' and 86'. However, in this form of the invention the release chamber 14' comprises generally the chamber that defines the area in which the container 46' of feed material is originally deposited into containment vessel 11'. Because container 46' enters the treatment system in the release chamber 14' itself, dunker member 52' is extended by actuator 56' along a vertical axis V in FIG. 7, rather than on an incline as shown in the previous embodiment. Treatment apparatus 10' also includes a feed system 20' different from feed system 20 shown in FIGS. 2 through 5. Feed system 20' includes a feed isolation chamber 42' set off to one side of release chamber 14' to accommodate the movement of dunker member 52' along a vertical axis. An inner door 43' and an outer door 44' work in unison to introduce containers 46' into the system similar to doors 43 and 44 described above with reference to FIG. 3. Feed system 20' also includes a plunger 45' adapted to be extended with a suitable actuator to push a container 46' into release chamber 14' when inner door 43' is opened. Plunger 45' is then retracted to allow door 43' to be closed and outer door 44' opened for loading another container of feed material into isolation chamber 42'.

Once container 46' of feed material is transferred into release chamber 14' in a position immediately under dunker member 52', as shown in FIG. 7, the dunker member may be extended to the position shown in FIG. 8 to push the container below the level 41' of liquid reactant metal. As in the previously illustrated embodiment, dunker member 52' may be adapted to crush or deform container on a crush surface, in this case comprising simply the floor of containment vessel 11' in the release chamber 14'. Unlike the form of the invention shown in FIGS. 2 through 5, a large portion of feed material and reaction products collect in a collection area 60' comprising the area in which the container was introduced into release chamber 14'. Only a portion of the feed materials and reaction products are carried by the flow of liquid reactant metal from left to right in the figures into treatment chamber 15'. For this material carried into treatment chamber 15', the treatment chamber provides sufficient contact time with the liquid reactant metal to reduce the feed materials and reaction products to the desired level.

However, the material rising to the collection area 60' in the release chamber in this form of the invention may not be chemically reduced to the desired level due to the limited contact time with the liquid reactant metal. In order to fully reduce materials collecting in area 60', the area is purged either periodically or continuously with a suitable purge fluid. The purge fluid preferably comprises conditioned flue gas from flue gas collection system 40'. Purged material, including the purge fluid itself, unreacted feed material, and intermediate and final reaction products are directed through a suitable conduit 50' to a treatment system 25' which corresponds to the treatment system 25 shown in FIG. 1. This arrangement for removing released gasses from area 60' and directing the gasses to treatment system 25' makes up a treatment arrangement in this form of the invention. The released fluid treatment system 25' preferably comprises a liquid reactant metal reactor. It will be appreciated that although a separate treatment system employing a second liquid reactant metal is indicated by FIGS. 7 through 9, the materials purged from area 60' may be injected into the liquid reactant metal in containment vessel 11'. Whether incorporated into the containment vessel 11' or otherwise, the released fluid treatment system 25' may comprise a system suited specifically for treating gasses such as the system-shown in U.S. Pat. No. 6,227,126.

It will be appreciated that the form of the invention shown in FIGS. 6 through 8 may allow solids and liquids to collect at the surface of the liquid reactant metal in release chamber 14' (at level 41'). Dunker member 52' may be used to dunk this material below the liquid reactant metal surface where it may be carried by the flow of liquid reactant metal into treatment chamber 15' and ultimately into output chamber 16'. From this location the solids and light liquids may be removed as described with reference to the embodiment shown in FIGS. 2 through 5.

The above described preferred embodiments are intended to illustrate the principles of the invention, but not to limit the scope of the invention. Various other embodiments and modifications to these preferred embodiments may be made by those skilled in the art without departing from the scope of the following claims. For example, the figures portray container 46 and 46' as a cylinder. Although cylindrical drums or canisters of feed material are prime candidates for treatment in the present system, the system may also be employed to treat feed materials in any other type of container, including packages, boxes, and bags. Also, electrical induction heating systems and other types of heating systems may be used to heat the reactant metal to the desired temperature in lieu of the burner system shown in the figures.

What is claimed is:

1. A liquid reactant metal treatment apparatus for treating materials, held in containers, the apparatus including:
   (a) a liquid reactant metal containment vessel;
   (b) a release chamber positioned to receive a first liquid reactant metal from the liquid reactant metal containment vessel;
   (c) a submerging arrangement for moving a container of feed material to a release location within the release chamber;
   (d) a collection area defined by an upper surface of the release chamber for collecting fluids generated from the feed material released from the container, and
   (e) a treatment arrangement for placing the fluids collected in the collection area in contact with the first liquid reactant metal or a second liquid reactant metal.

2. The apparatus of claim 1 further including a flow inducing arrangement for inducing a flow of first liquid reactant metal in the liquid reactant metal containment vessel from an inlet opening of the release chamber to an outlet of the release chamber.

3. The apparatus of claim 2 wherein the submerging arrangement includes a dunker member that extends along an inclined path from a feed area within the liquid reactant metal containment vessel to the release location within the release chamber.

4. The apparatus of claim 2 wherein the release chamber includes an upper inlet opening boundary at a first elevation of the liquid reactant metal containment vessel and an interior boundary at a second elevation above the first elevation.

5. The apparatus of claim 3 further including a crush surface within the release chamber, the crush surface extending generally perpendicular to the longitudinal axis of the dunker member.

6. The apparatus of claim 1 wherein the treatment arrangement includes a fluid handling system for removing fluid from the collection area and placing the fluid in contact with the first liquid reactant metal or the second liquid reactant metal.

7. A liquid reactant metal treatment apparatus for treating materials, held in containers, the apparatus including:
   (a) a liquid reactant metal containment vessel;
   (b) a release chamber connected to receive a first liquid reactant metal from the liquid reactant metal containment vessel;
   (c) a dunker member adapted to be driven along an incline between a retracted position above a liquid reactant metal level of the liquid reactant metal containment vessel and an extended position in which a distal portion of the dunker member extends to a release location adjacent to an inlet opening of the release chamber;
   (d) a flow inducing arrangement for inducing a flow of first liquid reactant metal the inlet opening of the release chamber to an outlet of the release chamber.

8. The apparatus of claim 7 wherein the release chamber includes an upper inlet opening boundary at a first elevation of the liquid reactant metal containment vessel and an interior boundary at a second elevation above the first elevation.

9. The apparatus of claim 8 further including an elongated treatment chamber connected to the outlet of the release chamber.

10. The apparatus of claim 9 wherein the treatment chamber is mounted within the liquid reactant metal containment vessel and further including at least one pressure relief passage positioned along the length of the treatment chamber.

11. The apparatus of claim 7 further including a crush surface extending generally perpendicular to the longitudinal axis of the dunker member.

12. A method for treating containerized materials, with a liquid reactant metal, the method including the steps of:
   (a) moving a container of feed material to a release location below an upper surface of a first liquid reactant metal;
   (b) releasing feed material from the container while the container is held at the release location;
   (c) collecting a released fluid in a released chamber, the released fluid made up of fluid generated from the released feed material; and
   (d) inducing a flow of liquid reactant metal through the release chamber from an inlet end of the release chamber to an outlet end of the release chamber, the flow of liquid reactant metal providing contact between the fluid collected in the release chamber and liquid reactant metal to effect a chemical reduction of compositions in the released fluid.

13. The method of claim 12 wherein the step of collecting the released fluids in the release chamber comprises collecting the released fluids below a level of liquid reactant metal in a liquid reactant metal containment vessel.

14. The method of claim 12 wherein the step of moving the container of feed material to the release location includes extending a dunker member along an incline from a feed area outside of the release chamber to a location within the release chamber.

15. The method of claim 12 further including the step of forcing released fluid to exit the release chamber into a treatment chamber.

16. The method of claim 15 further including the step of contacting released fluid within the treatment chamber with a flowing surface of the liquid reactant metal.

17. The method of claim 12 wherein the step of releasing feed material from the container while the container is held at the release location includes the step of deforming the container against a crush surface within the liquid reactant metal.

18. A method for treating containerized materials, with a liquid reactant metal, the method including the steps of:
   (a) placing a container of feed material in a first liquid reactant metal;

(b) releasing feed material from the container;

(c) collecting a released fluid in a release chamber, the released fluid made up of fluid generated from the feed material released in the first liquid reactant metal; and (d) removing the released fluid from the release chamber and injecting the released fluid into the first liquid reactant metal or a second liquid reactant metal.

19. The method of claim 18 the step of removing the released fluid from the release chamber includes injecting a purge fluid into the release chamber.

20. The method of claim 12 wherein the step of releasing feed material from the container includes the step of deforming the container against a crush surface within the first liquid reactant metal.

21. A liquid metal reactor system for treating waste materials, the reactor system including:

(a) a first reactor for contacting a first feed material with a first liquid reactant metal and for collecting reaction products including a slag and solidified metal from the first liquid reactant metal which collects at a surface of the first liquid reactant metal in the first reactor;

(b) a slag removal arrangement for removing the slag and solidified metal from the surface of the first liquid reactant metal in the first reactor; and (c) a second reactor connected to receive the slag and solidified metal from the slag removal arrangement, the second reactor for placing the slag and solidified metal in contact with the first liquid reactant metal or a second liquid reactant metal.

22. The reactor system of claim 21 wherein the first liquid reactant metal and second liquid reactant metal have substantially the same composition.

23. The reactor system of claim 21 wherein the first liquid reactant metal and second liquid reactant metal are provided from a common liquid reactant metal supply.

24. The reactor system of claim 21 wherein the first liquid reactant metal and second liquid reactant metal are made up primarily of aluminum.

25. A method for treating materials, in a liquid reactant metal, the method including the steps of:

(a) placing a first feed material in contact with a first liquid reactant metal to produce gaseous reaction products and allowing the gaseous reaction products to pass through the first liquid reactant metal to a surface of the first liquid reactant metal;

(b) collecting a slag and solidified metal from the first liquid reactant metal at the surface of the first liquid reactant metal;

(c) removing a the slag and solidified metal from the surface of the first liquid reactant metal;

(d) contacting the slag and solidified metal with the first liquid reactant metal or a second liquid reactant metal to return the solidified metal to a liquid state and segregate from the slag.

26. The method of claim 25 further including the step of conditioning the first liquid reactant metal and the second liquid reactant metal in a common conditioning vessel.

27. The method of claim 25 wherein the first liquid reactant metal and the second liquid reactant metal include a common primary constituent.

28. The method of claim 27 wherein the primary constituent in aluminum.

* * * * *

UNITED STATES PATENT AND TRADEMARK OFFICE
CERTIFICATE OF CORRECTION

PATENT NO. : 6,669,755 B2
DATED : December 30, 2003
INVENTOR(S) : Anthony S. Wagner It is certified that error appears in the above-identified patent and that said Letters Patent is hereby corrected as shown below:

Column 14,
Line 9, change "metal the" to -- metal from the --
Line 34, change "released chamber" to -- release chamber --

Column 16,
Line 17, change "a the" to -- the --

Signed and Sealed this

Twenty-ninth Day of June, 2004

JON W. DUDAS
*Acting Director of the United States Patent and Trademark Office*